(12) United States Patent
Yasuda et al.

(10) Patent No.: US 8,125,606 B2
(45) Date of Patent: Feb. 28, 2012

(54) DISPLAY DEVICE WITH BRANCHED TERMINAL ELECTRODE

(75) Inventors: Kyounei Yasuda, Kawasaki (JP); Futoshi Nakanishi, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 297 days.

(21) Appl. No.: 12/200,954

(22) Filed: Aug. 29, 2008

(65) Prior Publication Data

US 2009/0059153 A1 Mar. 5, 2009

(30) Foreign Application Priority Data

Aug. 31, 2007 (JP) ................................. 2007-225342
Jun. 20, 2008 (JP) ................................. 2008-162070

(51) Int. Cl.
*G02F 1/1345* (2006.01)

(52) U.S. Cl. ......... 349/152; 349/149; 349/150; 349/151

(58) Field of Classification Search ........... 349/149–152
See application file for complete search history.

(56) References Cited

U.S. PATENT DOCUMENTS

| 7,508,478 B2* | 3/2009 | Kamiya et al. ................ 349/145 |
| 7,580,107 B2* | 8/2009 | Moon ............................ 349/192 |
| 2005/0083472 A1 | 4/2005 | Nakanishi | |

FOREIGN PATENT DOCUMENTS

| CN | 1609685 | 4/2005 |
| JP | 8-82805 | 3/1996 |
| JP | 2000-184144 | 6/2000 |
| JP | 2004-125975 | 4/2004 |
| JP | 2004-205550 | 7/2004 |
| JP | 2005-311590 | 11/2005 |
| JP | 2006-014014 | 1/2006 |
| JP | 2008-026713 | 2/2008 |

OTHER PUBLICATIONS

Chinese Office Action dated Mar. 17, 2011 in corresponding Chinese Application No. 200810215126.5 with English translation of Chinese Office Action.
Japanese Patent Office issued a Japanese Office Action dated May 12, 2010, Application No. 2008-191745.

* cited by examiner

*Primary Examiner* — Phu Vu
(74) *Attorney, Agent, or Firm* — Young & Thompson

(57) ABSTRACT

A display device includes a first substrate having a group of terminal electrodes on one side thereof, at least one of the terminal electrodes forming a branched electrode with an isolation region extending along an elongating direction of each the terminal electrode and a second substrate opposing the first substrate such that the terminal electrodes are exposed from an overlapping area of the first substrate and the second substrate.

6 Claims, 13 Drawing Sheets

US 8,125,606 B2

DISPLAY DEVICE WITH BRANCHED TERMINAL ELECTRODE

INCORPORATION BY REFERENCE

This application is based upon and claims the benefit of priority from Japanese Patent Application No. 2007-225342, filed on Aug. 31, 2007, and No. 2008-162070, filed on Jun. 20, 2008, the disclosure of which is incorporated herein in its entirety by reference.

BACKGROUND OF THE INVENTION

1. Technical Field

The present invention relates to a display device and in particular, relates to a terminal electrode thereof for connecting with an external wiring board.

2. Background Art

In recent years, a display device, especially flat panel display device is widely used as a high-resolution display. A liquid crystal display (LCD) device is one of these flat panel display devices. This LCD device has a substrate (hereinafter, referred to as a TFT substrate) in which switching elements such as thin film transistors (TFTs) are formed and an opposed substrate (hereinafter, referred to as a CF substrate) in which a color filter and a black matrix or the like are formed. The LCD device enables a display by changing an electric field applied to liquid crystal sandwiched between the TFT substrate and the CF substrate to change an alignment direction of molecules of the liquid crystal and thereby controlling amount of transmission light for every pixel. The TFT substrate is connected to an external wiring board in which a drive circuit is provided to apply the electric field to the liquid crystal. A TCP (Tape Carrier Package), a COG (Chip On Glass) and a COF (Chip On Film) or the like are employed as the external wiring board.

FIG. 10 shows a cross sectional view of an ordinary LCD device adopting the TCP as the external wiring board. The size of the TFT substrate 1 is made larger than the CF substrate 13 as shown in FIG. 10 to provide a contact area for the TCP. An area where the TFT substrate 1 and the CF substrate 13 oppose via a liquid crystal material 14 is called a display area. The remaining area is called a peripheral area which includes a terminal area of the TFT substrate 1 extended from the CF substrate 13 and an area of a sealant 15 adjacent to this display area 16B. A group of terminal electrodes derived from the display area is formed on the terminal area of the TFT substrate. In the display area 16B, data lines, scanning lines, power source wiring, etc. are formed on the TFT substrate 1 and they are lead out to the terminal area by way of lead area. In FIG. 10, all of the terminal electrodes, lead electrodes in the lead area and those wiring lines associated with TFTs and pixel electrodes in the display area are formed in common by a metal wiring layer 2. The terminal electrodes formed on an end side of this metal wiring layer 2 are electrically connected to a TCP 8 via a TCP wiring terminal 9 thereof by using an anisotropic conducting film (hereafter, referred to as an ACF) 7.

Details around a contact portion between the TFT substrate 1 and the TCP 8 in the terminal area in FIG. 10 are shown in FIG. 11. As shown in FIG. 11A and FIG. 11B, the metal wiring layer 2 is coated with an insulating layer 4 for protecting the metal layer 2. And a contact hole 5 is formed in the insulating layer 4 to expose the metal wiring layer 2 at a portion of each terminal electrode. The contact hole 5 is coated with a surface conductive layer 6 made of indium tin oxide (ITO) or the like to provide connecting regions for electrically connecting the TFT substrate 1 and the TCP 8.

When the TCP 8 is connected to the terminal electrode 2, the contact hole 5 is covered with the surface conductive layer 6 and the ACF 7. However, the moisture permeation depression effect of the ITO is low, and the ACF 7 has a certain amount of water absorption. Actually, as shown in FIG. 12A and FIG. 12B, the misplacement tends to occur in a case where the metal wiring layer 2 and the TCP wiring 9 are press-welded due to variation in alignment accuracy of a pressure welding equipment used in the TCP pressure welding. The corrosion due to the misplacement mentioned above tends to occur at an edge portion of the contact hole 5 which is usually not covered with the insulating layer 4. Therefore, it becomes important to prevent disconnection of the terminal electrode 2 due to corrosion, and to suppress the display failure.

In an LCD device, a wiring metal of low electric resistivity is adopted for high definition display with a large screen. Therefore, instead of corrosive resistant wiring materials, such as Cr (chromium), low electric resistive metal such as Al (aluminum) and Cu (copper) are used despite of low corrosion resistance. Accordingly, corrosion prevention measures for the terminal electrode 2 have become increasingly important under such circumstances.

An example of a related technology of such measure is disclosed in Japanese Patent Application Laid-Open No 2004-205550. A terminal electrode of an image display device described in this gazette has a configuration that an opening (a contact hole) not covered with an insulating layer on a conductive layer is arranged so that it may bring near by one edge of the conductive layer. It is supposed that the time required for a corrosion reaction occurred at a portion of the opening to reach both ends of the conductive layer may be delayed, and thus a disconnection of the terminal electrode can be suppressed by this configuration.

SUMMARY

An exemplary object of the present invention is to provide a display device in which total disconnection of a terminal electrode can be prevented, even if corrosion thereof occurs.

A display device according to an exemplary aspect of the present invention is provided with a first substrate including a group of terminal electrodes on one side thereof, and a second substrate opposing to the first substrate. At least one of the terminal electrodes forms a branched electrode with an isolation region extending along an elongating direction of each the terminal electrode. The second substrate is arranged such that the terminal electrodes are exposed from an overlapping area of the first substrate and the second substrate. A corrosion resistance conductive layer for covering the terminal electrodes and the isolation region in common and for conducting each terminal electrode isolated by the isolation region electrically is provided.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

An LCD device, which is an example of a display device, according to a first exemplary embodiment of the present invention will be described with reference to FIGS. 1 to 5.

Figure 1A:
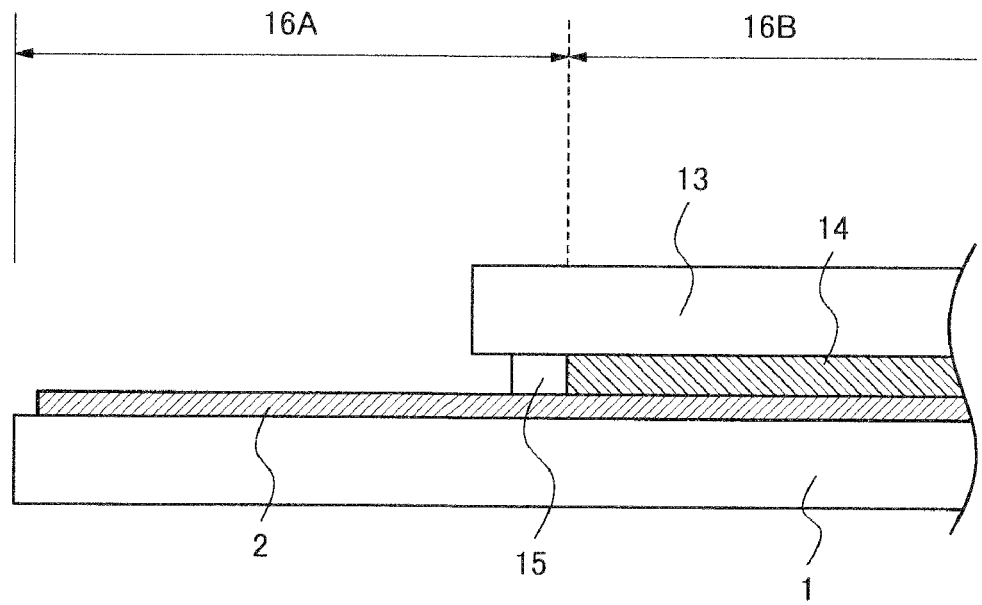
FIG. 1A is a cross sectional view showing a structure of an LCD device according to a first exemplary embodiment of the present invention.
Figure 1B:
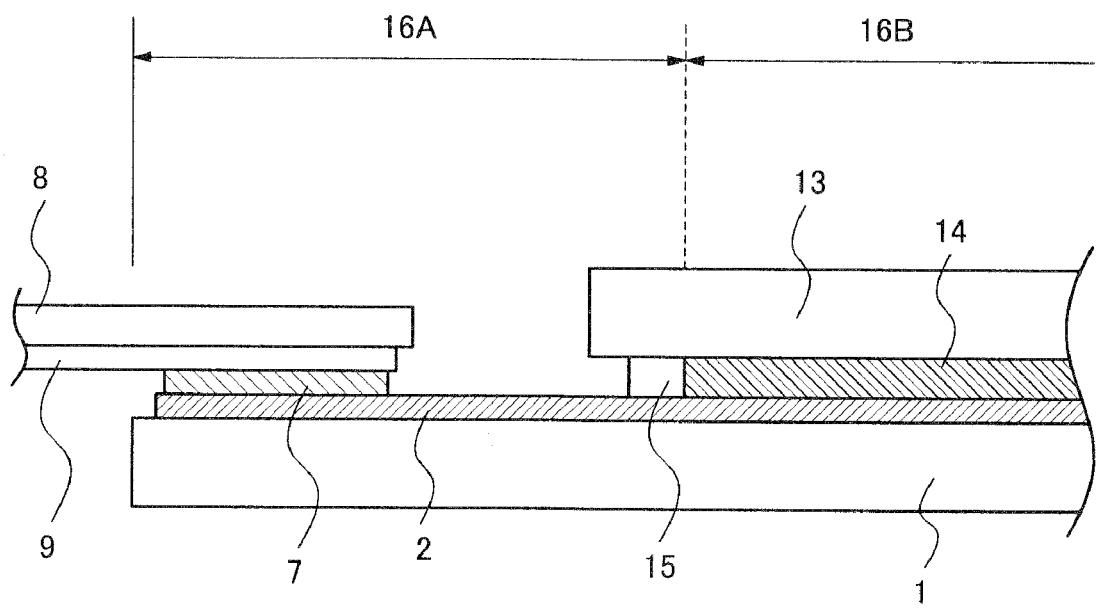
FIG. 1B is a cross sectional view showing a configuration of connecting a TCP with the LCD device of FIG. 1A.

FIG. 1 is a cross sectional view showing a structure of a terminal electrode of the LCD device according to this exemplary embodiment. FIG. 1A shows a configuration of the LCD device prior to connecting an external wiring board such as a TCP (tape carrier package). A TFT substrate 1 as a first substrate is assumed to be an active matrix substrate in which thin-film transistors (TFTs) are arranged as switching elements at matrix form (not illustrated). A color filter and a black matrix or the like are formed on a CF substrate 13 as a second substrate. Liquid crystal material 14 is sandwiched between the TFT substrate 1 and the CF substrate 13, and sealed with a sealant 15. As shown in FIG. 1A, the TFT substrate 1 includes a display area 16B and a peripheral area 16A. The display area 16B is an area where the liquid crystal material 14 exists between the TFT substrate 1 and the opposing CF substrate 13. TFTs (not illustrated) are arranged in the display area. The peripheral area 16A is located adjacent to the display area 16B. The peripheral area 16A includes both an area of the sealant 15, and an area where the TFT substrate 1 is extended from the overlapping area of the CF substrate 13 and the TFT substrate 1. A metal wiring layer 2 lead-out from the display area 16B is formed in this peripheral area 16A, and as shown in FIG. 1B, terminal electrodes for connecting with an external wiring board on which a drive circuit for the TFT is formed.

In FIG. 1B, a TCP 8 as a wiring board is bonded to the TFT substrate 1. A TCP wiring 9 as a wiring terminal formed in the TCP 8 is connected with the terminal electrodes 2 of the TFT substrate 1 via an anisotropic conductive film (hereinafter, referred to as ACF) 7.

Figure 2A:
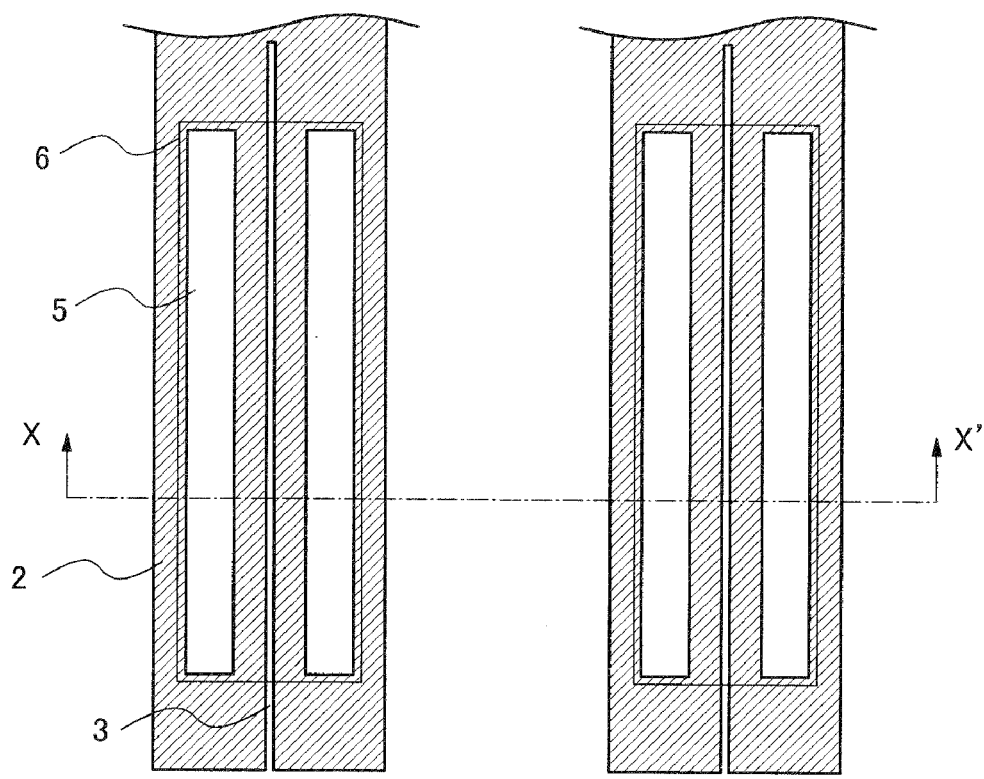
FIG. 2A is a plan view showing a structure of a terminal electrode of a TFT substrate according to the first exemplary embodiment of the present invention.
Figure 2B:
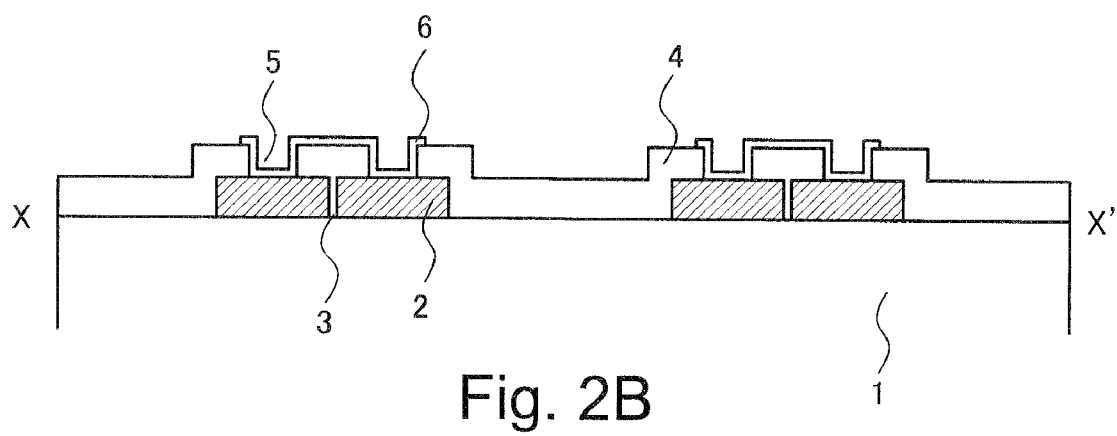
FIG. 2B is a cross sectional view along an X-X' line of FIG. 2A.

A structure of the terminal electrode of the TFT substrate 1 in this exemplary embodiment is shown in FIG. 2. FIG. 2A is a portion plan view from the TFT substrate (upper side in FIG. 2) and FIG. 2B is a cross sectional view along an X-X' line of FIG. 2A. In FIG. 2, although two terminal electrodes are arranged side by side in the peripheral area, terminal electrodes are usually arranged side by side by an identical pitch according to the number of wirings, and a group of terminal electrodes is formed. However, according to this exemplary embodiment, neither the number of terminal electrodes nor arrangement thereof is limited in particular.

As shown in FIG. 2, each terminal electrode on the TFT substrate 1 includes two mutually separated metal wiring layer 2. In this exemplary embodiment, a slit is provided as an isolation region near a center of each terminal electrode to form a forked electrode or a branched electrode. That is, a metal layer removing portion (hereafter referred to as a slit) 3 is formed. That is, each terminal electrode 2 on the TFT substrate 1 is provided with a slit to form a branched metal layer 2. When corrosion occurs at a portion of the branched metal layer 2, the corrosion invades with time in the branched metal layer 2. However, since the branched metal layer 2 is separated by the slit 3 according to this exemplary embodiment, the invasion of the corrosion is prevented by this slit 3. Accordingly, last disconnection of the terminal electrode by corrosion can be prevented.

It is desirable to form this branched electrode on a terminal area and its lead electrode on a lead area with a low-resistance metal film. As the low-resistance metal, an aluminum (Al), a silver (Ag) and a copper (Cu) or the like can be used as a principal material. In order to improve corrosion resistance, an alloy with anticorrosion metals, such as a neodymium (Nd), may be used. But an alloy with anticorrosion metals is a high-resistivity and high-cost. The terminal electrode and the lead electrode can also be made with a lamination structure of two layers or three layers. The slit 3 should be formed in at least one terminal electrode, and not necessarily needs to be provided in all terminal electrodes. Although the illustrated slit 3 is formed with a constant width in FIG. 2, a shape thereof is not limited in particular, and the width thereof may be changed and the slit thereof may be bent. Those variations are also applied to other exemplary embodiments described hereafter.

As shown in FIG. 2B, a portion of an insulating layer 4 formed on the branched metal layer 2 is removed to form a contact hole 5. Here, the contact hole 5 is formed on each of the branched metal layer 2. The insulating layer 4 protects the terminal metal layer 2 from the open air. Material of the insulating layer 4 is not restricted, but an inorganic insulating film, such as $SiN_x$ and $SiO_2$, is usually used. Although the insulating layer 4 is one layer structure as shown in FIG. 2B, it may be formed by a lamination structure with a plurality of insulating materials.

A surface conductive layer 6 is formed on two contact holes 5 and part of the insulating layer 4 to cover the exposed metal layer 2 completely. Thus the surface conductive layer 6 is also formed on the insulating layer 4 located on the slit 3 in this exemplary embodiment, and thereby increasing a connection area for an ACF 7. As the surface conductive layer 6, oxide transparent conductive film of an indium tin oxide (ITO) and an indium zinc oxide (IZO) or the like can be used.

As shown in FIG. 2A, the slit 3 is formed longer than the contact hole 5 and the surface conductive layer 6 covering it completely. It is desirable that the slit 3 extends over the tip ends of the contact hole 5, i.e., an upward direction and a downward direction on a drawing sheet of FIG. 2A. This is because, even if the corrosion generated at the tip end of the contact hole 5 extends toward outside the contact hole 5, elongated slit 3 prevents the corrosion to reach adjacent contact hole and thus total disconnection is avoided. It is desirable to form the slit 3 so that the metal wiring layer 2 which forms the terminal electrode may be separated completely to form a branched electrode at a side of a lower portion of FIG. 2A, i.e., a tip end area of a terminal electrode. However, as long as there is an enough tip end area for the terminal electrode, the slit 3 at the side of a lower portion of FIG. 2A may be formed not to extend outside of the tip end of the terminal electrode as well as the side of the upper portion (lead area). As an extended distance at this case, it can be considered, for example as a distance larger than width of each branched metal wiring layer 2.

Next, a case where the TCP 8 is press-welded to the TFT substrate 1 is explained. In this case, as described below, the corrosion occurs in the terminal electrode owing to misplacement at the time of connecting the TFT substrate 1 and the TCP 8, and then display failure arises.

Figure 11A:
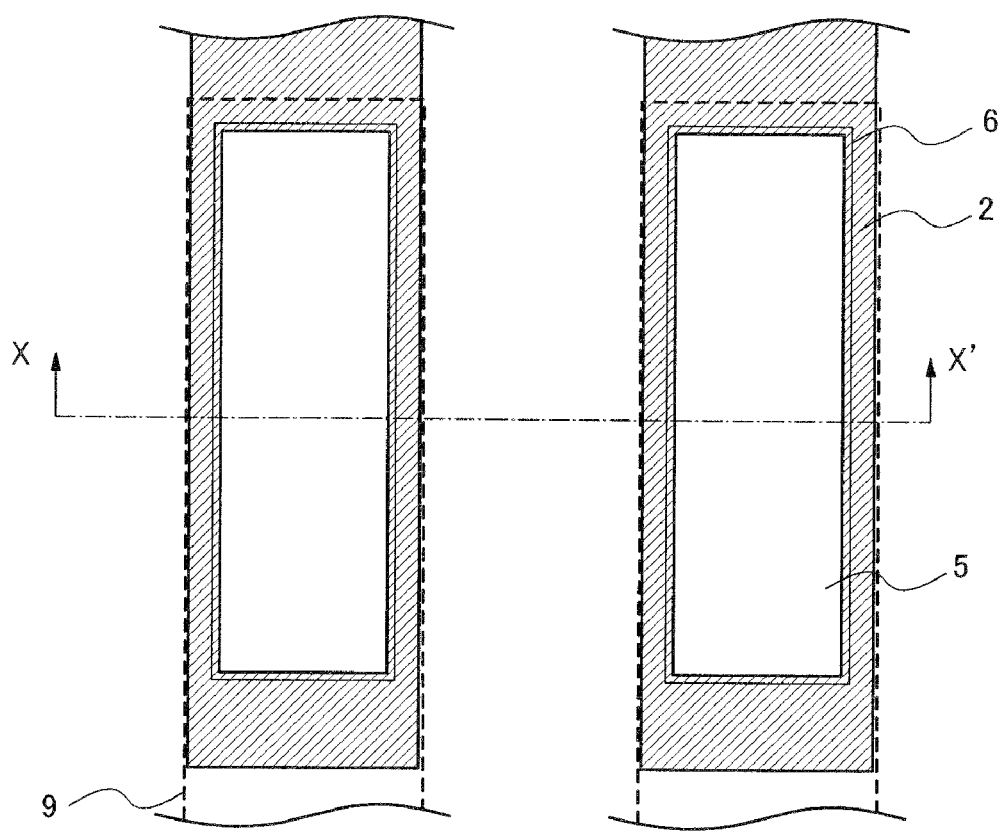
FIG. 11A is a plan view showing a structure (a case of without misplacement) of a terminal electrode in a state that a TCP is press-welded to a TFT substrate of a related LCD device.
Figure 11B:
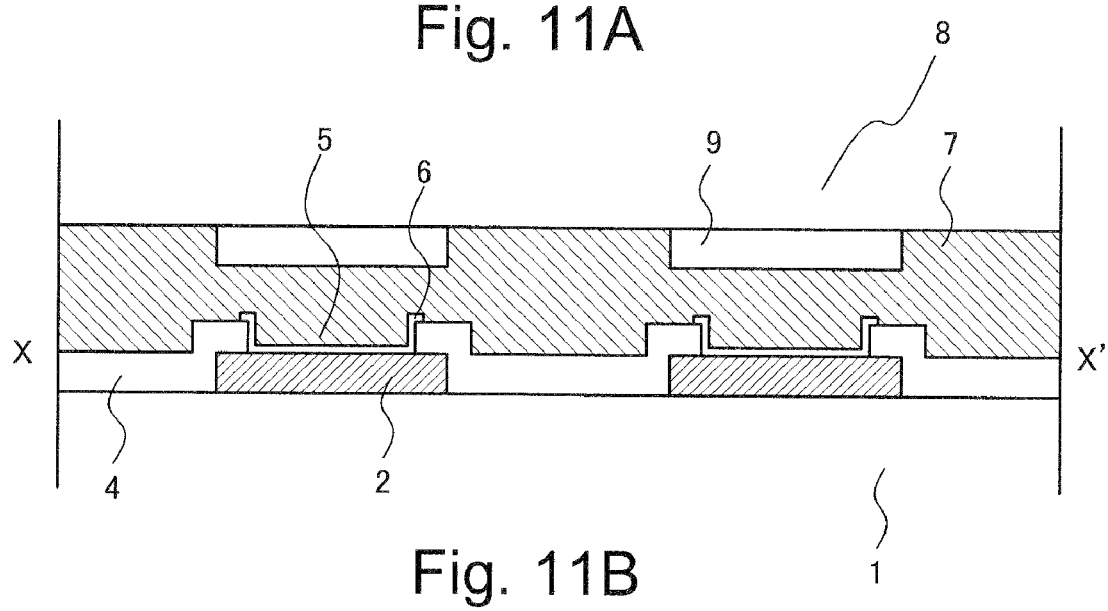
FIG. 11B is a cross sectional view along an X-X' line of FIG. 11A.
Figure 12A:
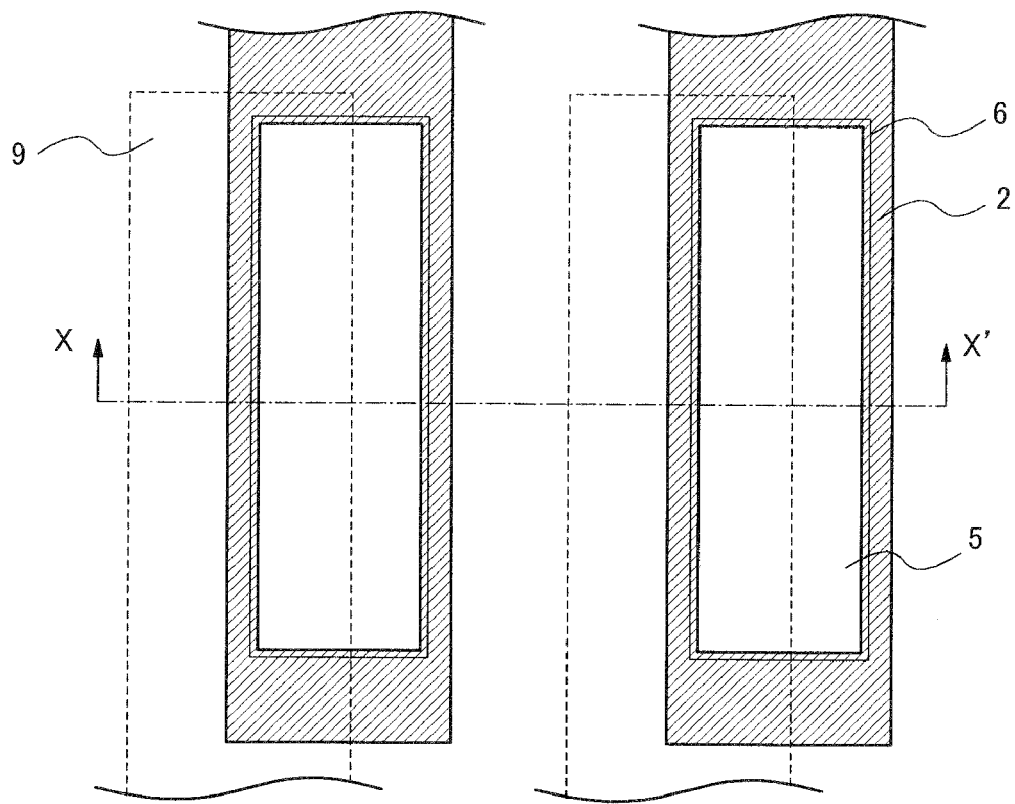
FIG. 12A is a plan view showing a structure (a case of misplacement) of a terminal electrode in a state that a TCP is press-welded to a TFT substrate of a related LCD device.
Figure 12B:
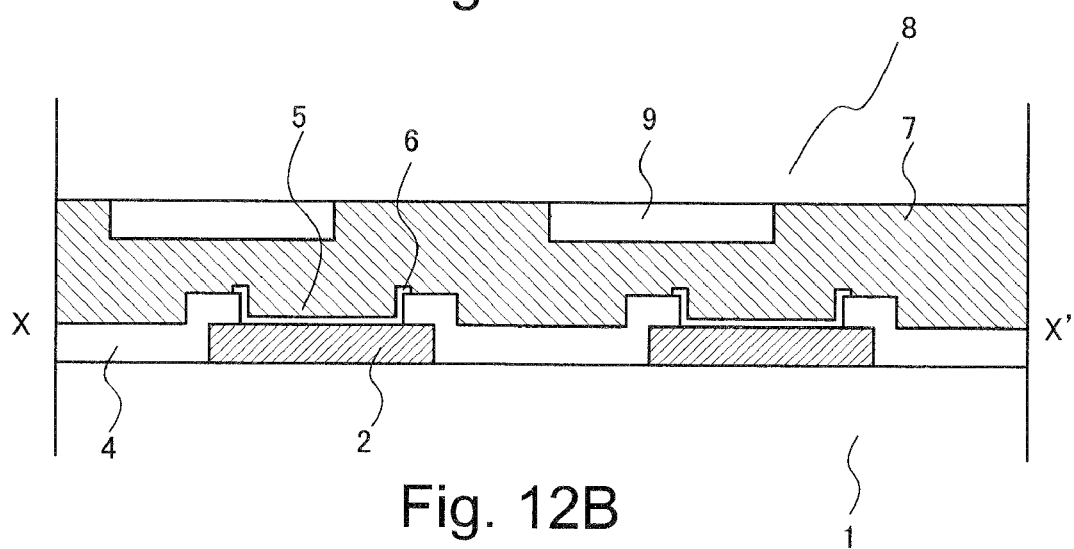
FIG. 12B is a cross sectional view along an X-X' line of FIG. 12A.
Figure 13A:
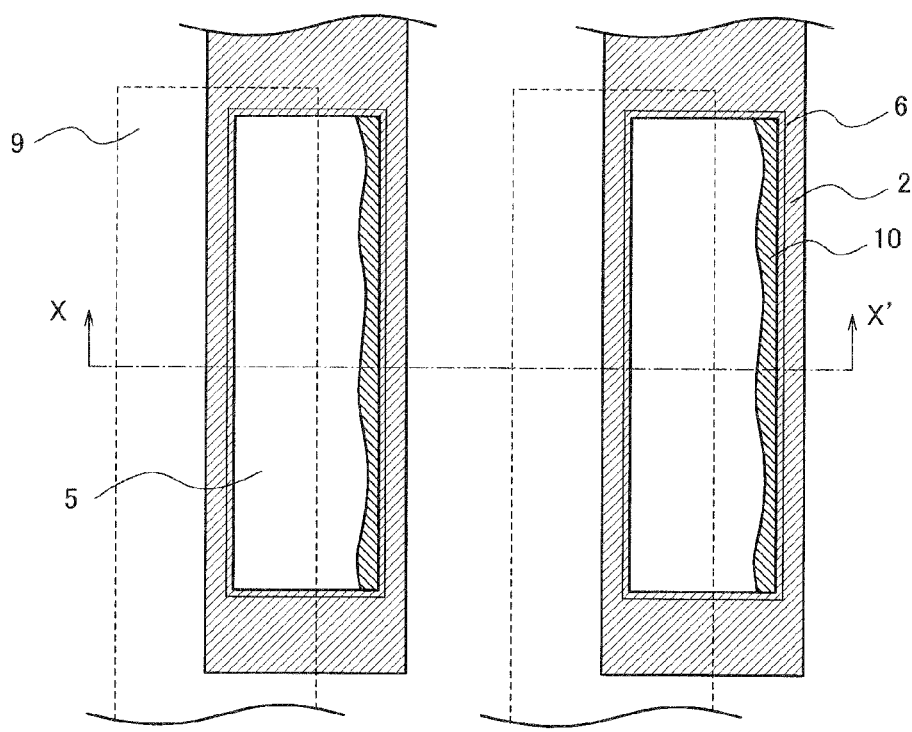
FIG. 13A is a plan view showing a structure (a case of misplacement and corrosion) of a terminal electrode in a state that a TCP is press-welded to a TFT substrate of a related LCD device.

FIG. 11 shows a state where the metal wiring layer 2 which forms the terminal electrode on the TFT substrate 1, and the TCP wiring 9 of the TCP 8 are stuck without a misplacement. Actually, however, as shown in FIG. 12A and FIG. 12B, the misplacement tends to occur in a case where the metal wiring layer 2 and the TCP wiring 9 are press-welded due to variation in alignment accuracy of a pressure welding equipment used in the TCP pressure welding. Since a product is usually designed with a certain amount of tolerance to that misplacement, in an initial displaying state, it does not become a defect. However, as shown in FIG. 13A and FIG. 13B after an endurance test under a high-humidity/temperature environment, display failure occurs due to occurrence of corrosion 10.

The corrosion 10 due to the misplacement mentioned above tends to occur at an edge portion of the contact hole which is usually not covered with the insulating layer 4 and at a side where the TCP wiring 9 does not oppose to it owing to the misplacement. Following two causes are considered as a mechanism for the occurrence of that corrosion. The first cause is that since an upper portion of the contact hole 5 is not covered with the TCP wiring 9, it becomes easy for moisture or the like that to permeate to the contact hole 5 from an outside environment. The second cause is that an adjacent TCP wiring 9 pressure-welded to the neighboring terminal electrode comes near the contact hole 5 by the misplacement thereof. That is, when display signals are applied to the TCP wirings 9, the metal layer 2 receives different electric fields from the adjacent TCP wirings 9, and thus electric potential difference arise therebetween.

Figure 13B:
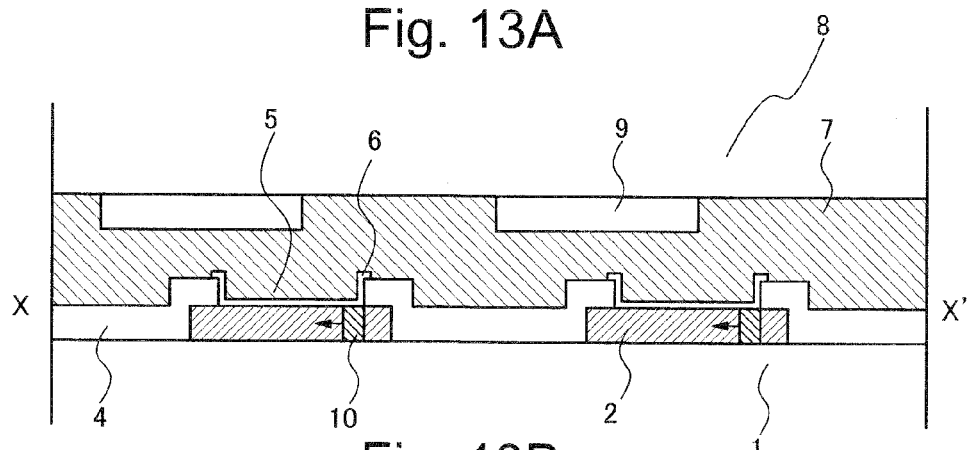
FIG. 13B is a cross sectional view along an X-X' line of FIG. 13A showing a partial corrosion occurrence; and, FIG. 13C is a cross sectional view along an X-X' line of FIG. 13A showing a corrosion progression.
Figure 13C:
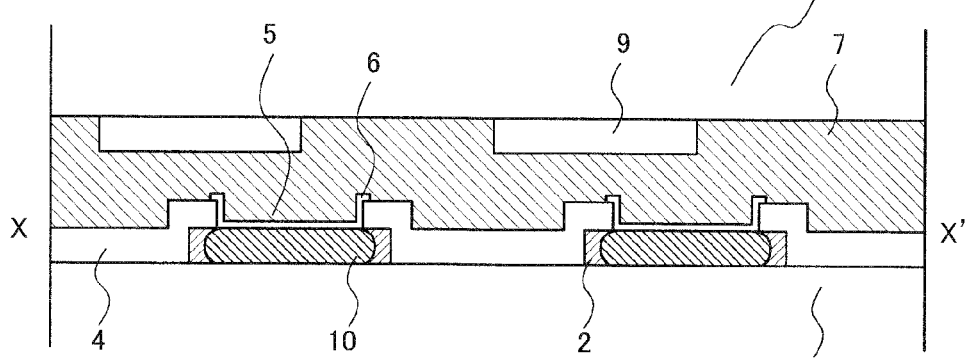

And with the passage of time, as shown in FIG. 13B and FIG. 13C, the corrosion 10 develops from a contact hole edge at a side which is not covered with TCP wiring 9 to the metal wiring layer 2, and grows toward a contact hole edge of an opposite side thereof. Even in the metal wiring layer 2 covered with the insulating layer 4, corrosion also grows but its progress of corrosion is slow as compared with the metal wiring layer 2 directly under the contact hole 5.

Under the progress of that corrosion, connection resistance between the surface conductive layer 6 and the metal wiring layer 2 increases, and disconnection of a metal wiring layer 2 is also generated with growth of the corrosion 10, and thus display failure occurred.

However, in an LCD device according to this exemplary embodiment as described below, even when misplacement arises at the time of connection of the TFT substrate 1 and the TCP 8, total disconnection of the metal wiring layer 2 by corrosion can be prevented.

Figure 3A:
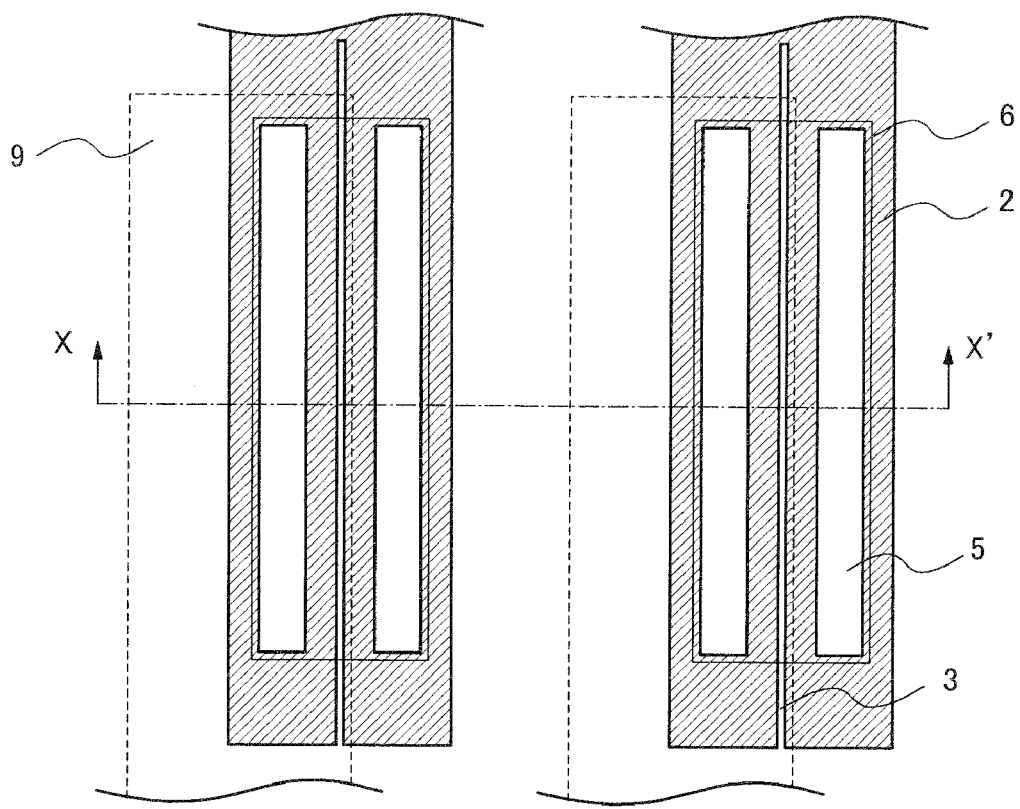
FIG. 3A is a plan view showing a structure (a case of misplacement) of the terminal electrode in a state that a TCP is press-welded to the TFT substrate with misplacement according to the first exemplary embodiment of the present invention.
Figure 3B:
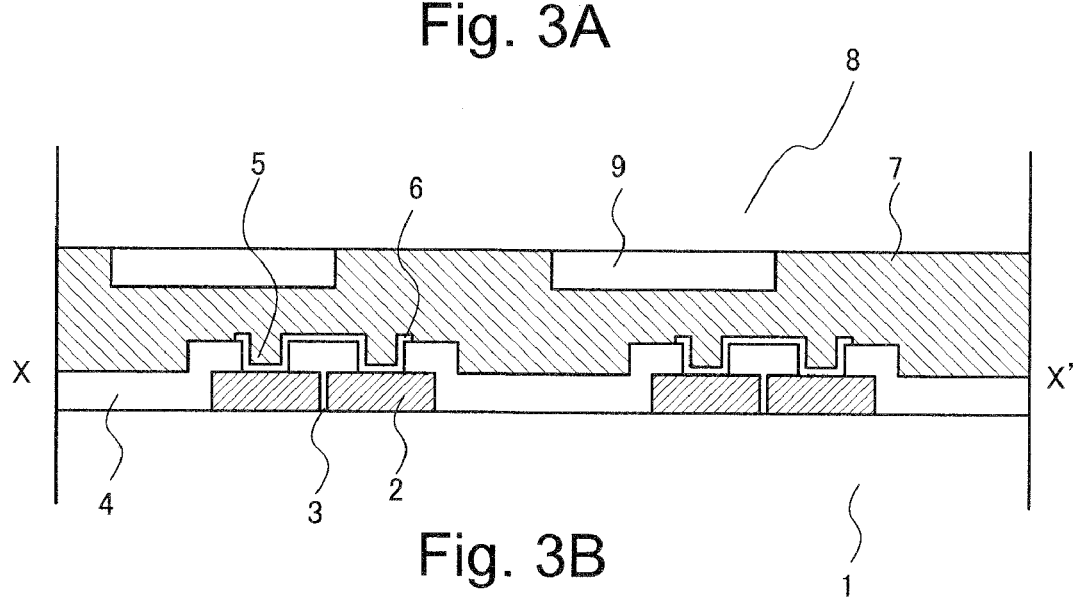
FIG. 3B is a cross sectional view along an X-X' line of FIG. 3A.

In FIG. 3, a terminal electrode structure is shown that where the TCP 8 is pressure-welded to the TFT substrate 1 via the ACF 7 in the LCD device according to this exemplary embodiment. This drawing shows a case that the TCP wirings 9 are pressure-welded to the terminal electrodes of the TFT substrate 1 with the displacement toward left-hand side thereof. The TCP wirings 9 and the surface conductive layer 6 formed on the top layer of the terminal electrodes are connected via the ACF 7. Since the ACF 7 has such anisotropy that its conductivity direction is limited to only in a direction perpendicular to a principal plane of the substrate 1, only TCP wiring 9 facing one terminal electrode of the TFT substrate 1 is connected each other. The misplacement at the time of TCP pressure welding is generated from variation in alignment accuracy of pressure welding equipment and so on. Since it is difficult to always pressure-weld without the misplacement, the terminal electrodes and the TCP 8 are designed with a certain amount of tolerance. Therefore, display failure is not generated in a state of an initial display.

As mentioned above, when the misplacement arise at the time of the TCP pressure welding, corrosion occurs, and there is the problem that faulty connection and disconnection of wire arise according to progress of this corrosion reaction. It is explained below the reason why this problem is solved by adopting the structure of the terminal electrodes of this exemplary embodiment.

Figure 4A:
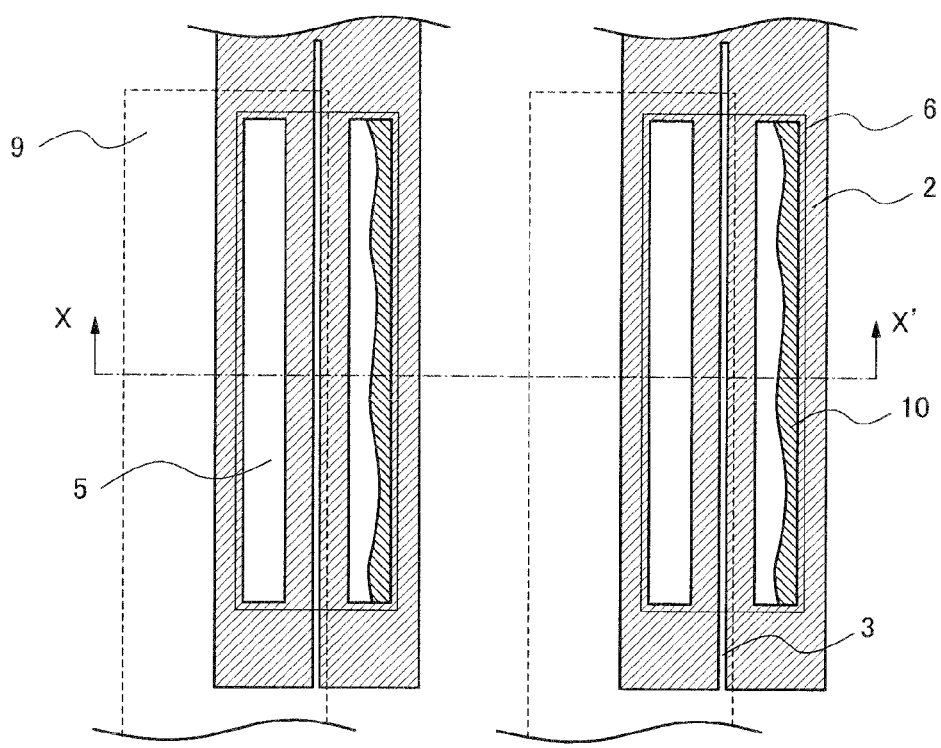
FIG. 4A is a plan view showing a structure (a case of misplacement and corrosion) of the terminal electrode in a state that a TCP is press-welded to the TFT substrate according to the first exemplary embodiment of the present invention.
Figure 4B:
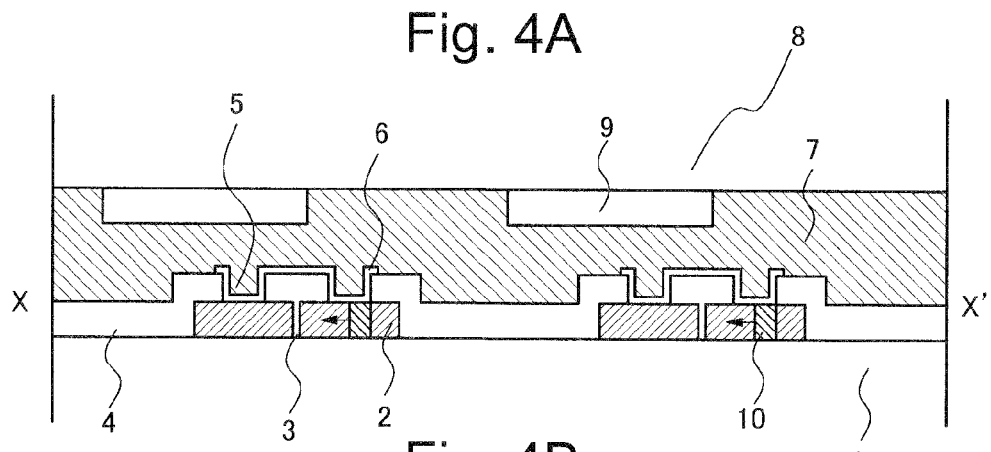
FIG. 4B is a cross sectional view along an X-X' line of FIG. 4A in a case when corrosion is stopping at a portion.
Figure 4C:
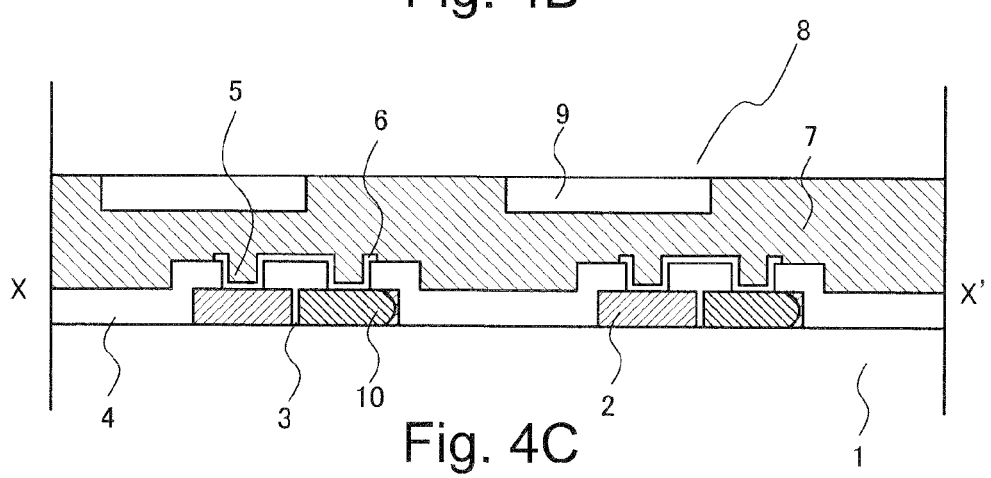
FIG. 4C is a cross sectional view along an X-X' line of FIG. 4A in a case which corrosion advanced.

As shown in FIG. 4A and FIG. 4B, the corrosion 10 of the metal wiring layer (terminal electrode) 2 occurs first at the edge of the contact hole 5 (contact hole 5 on the right-hand side of each terminal electrode) which is not covered with the TCP wiring 9. The occurred corrosion 10 progresses toward an edge of the left of the drawing with time, i.e., the contact hole of the opposite side. Since the corrosion 10 propagates mainly in the metal wiring layer 2, the progress of the corrosion 10 stops at a separation portion of the metal wiring layer 2, i.e., a slit 3 of the branched electrode (FIG. 4C) in this exemplary embodiment. One side of the branched electrode with the corrosion 10 causes such failures as increase of connection resistance due to progress of the corrosion. The other side of the branched electrode, however, since the corrosion 10 does not progress, its connection resistance does not increase and last disconnection of wire does not occur.

When the corrosion 10 progresses to entire area of one side of the metal wiring layer 2 (FIG. 4C), the connection resistance of the corroded metal wiring layer 2 increases, and thus the connection resistance between the surface conductive layer 6 and the metal wiring layer 2 also increases. However, sufficient electrical connection can be made only by using the other side of the metal wiring layer 2 in which the corrosion is not propagated. Therefore, there is no problem of a display as an LCD device.

On the other hand, in the connection electrode (terminal electrode) described in the background art of the related art (Japanese Patent Application Laid-Open No. 2004-205550), a configuration in which the contact hole is arranged near by one edge of the conductive layer is adopted. However, with this configuration, it is effective only for the misplacement in one direction in the TCP pressure welding. Moreover, by arranging the contact hole near by one edge of the conductive layer, the area of the contact hole is made small. Therefore, when corrosion occurs in the metal wiring layer of the contact hole formation portion, the corrosion progressed all over the contact hole, and thus causing a connection failure between the surface conductive layer and the metal wiring layer will occur.

Next, a method of manufacturing the terminal electrode of the LCD device by this exemplary embodiment will be described with reference to FIG. 5, which is a cross sectional process view showing the structure of the terminal electrode of the TFT substrate of this exemplary embodiment.

Figure 5A:
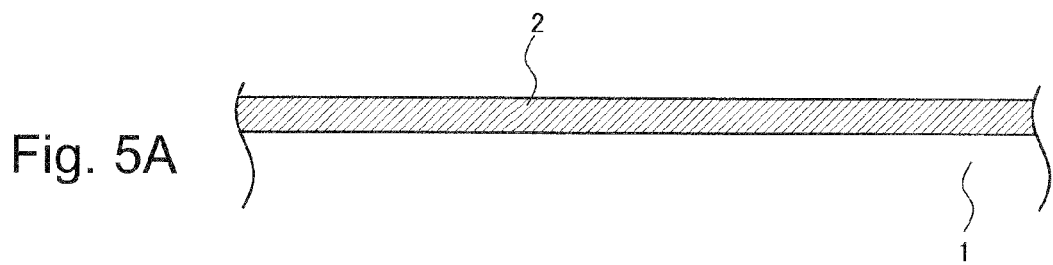
FIGS. 5A to 5F are steps of cross sectional views showing a method of manufacturing a terminal electrode of the TFT substrate according to the first exemplary embodiment of the present invention.

First, as shown in FIG. 5A, for example, the metal wiring layer 2 is formed using a sputtering method or the like on a surface of the TFT substrate 1. A glass substrate can be used for the TFT substrate 1. The glass substrate which deposited an insulating film of $SiN_x$ or $SiO_2$ thereon may be used. As for the terminal electrode and its outgoing line formed by the metal wiring layer 2, low melting point metals, such as aluminum, Ag, Cu, and an aluminum-Nd alloy formed by adding an anticorrosion metal, such as Nd, to aluminum can be used. Although thickness of the metal wiring layer 2 is not limited in particular in this embodiment, it could be about 200 nm. Not only one layer shown in FIG. 5 but lamination structure of Al or low melting point metals, such as Ag and Cu, and a high melting point metal, such as Me, may be adopted as the metal wiring layer 2. Although there is no limitation in particular also in thickness of each metal wiring layer 2 in this case, it may be used a configuration of 50-nm thick Mo layer as an upper metal wiring layer, and about 1200-nm thick Al layer as a lower layer metal wiring layer, for example.

Figure 5B:
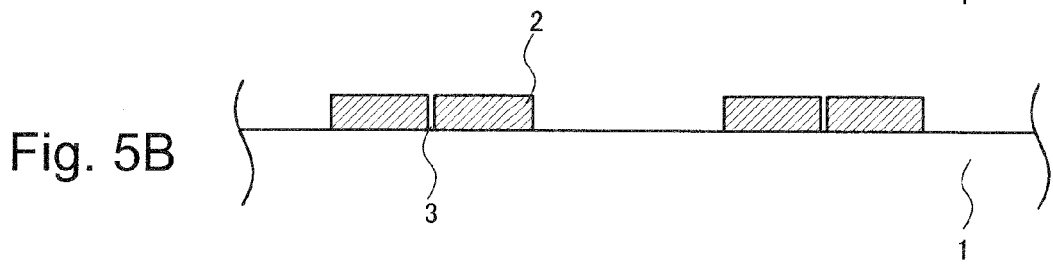

Next, as shown in FIG. 5B, the metal wiring layer 2 is patterned. An ordinary photolithography technology can be used for a patterning method. According to this embodiment, a positive resist is formed in a portion which leaves a pattern of a metal wiring layer, and then the metal wiring layer 2 is formed by using this resist as a mask. The pattern of the metal wiring layer 2 shown in FIG. 5B is obtained by removing the resist. When patterning this metal wiring layer 2, the metal wiring layer 2 is divided to form a branched electrode by forming the slit 3 in a predetermined portion of at least one terminal electrode. It is desirable to extend and form the slit 3 towards the upper and lower sides of FIG. 2A including an area in which a surface conductive layer 6 is formed at a next process. A wet etching method which uses a mixed acid of a phosphoric acid/nitric acid/acetic acid/water, for example can be adopted for etching the metal wiring layer 2. Also when a laminated wiring layer of a Mo/aluminum system is adopted, taper etching of the laminated film can be performed together by using this wet etching method.

Figure 5C:
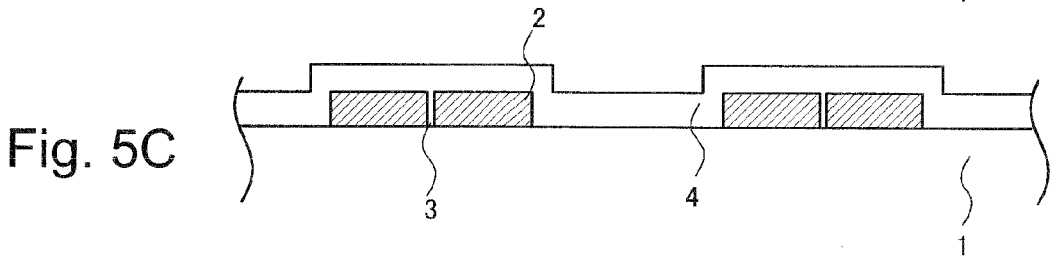

Next, as shown in FIG. 5C, the insulating layer 4 is deposited on a surface of the TFT substrate 1 so that the patterned metal wiring layer 2 may be covered completely. For example, a $SiN_x$ film is formed by about 300 nm of thickness as the insulating layer 4 by using a plasma CVD (chemical vapor deposition) method. Material used for the insulating layer 4 can use insulating materials, such as not only a $SiN_x$ film but $SiO_2$ film. Not only one layer but a laminated film may be available as the insulating layer 4.

Figure 5D:
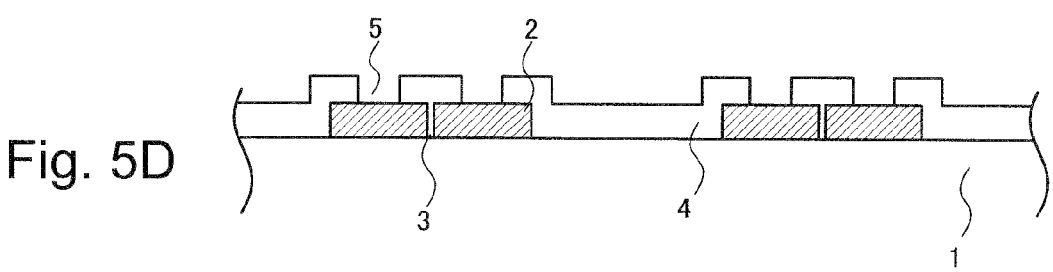

Next, as shown in FIG. 5D, the contact hole 5 is formed in the insulating layer 4 deposited on the metal wiring layer 2. The contact hole 5 is formed in a portion which becomes a connection region for connecting with the TCP wiring 9 via the ACF 7. An ordinary photolithography technology can be used also for formation of the contact hole 5. According to this embodiment, a positive resist is formed except the area which becomes the pattern of the contact hole 5, and the insulating layer 4 is removed by etching using this resist as a mask. Then the contact hole 5 shown in FIG. 5D is formed by removing this resist. For example, a dry etching method using gas of a $SF_6$ system and a $CHF_3$ system and a wet etching method using a buffered hydrofluoric acid can be used for etching the insulating layer 4.

Figure 5E:
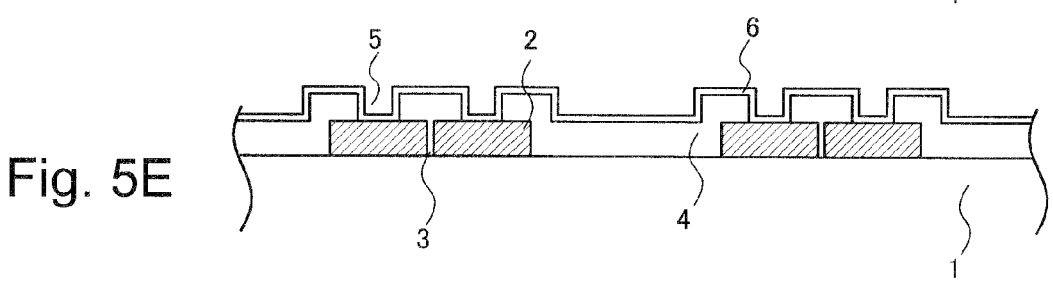

Next, as shown in FIG. 5E, the surface conductive layer 6 is deposited on the surface of the TFT substrate 1. A transparent conductive film of either ITO or IZO can be used for the surface conductive layer 6. The surface conductive layer 6 can be formed by about 100 nm of thickness depositing this transparent conducting film by using a spattering process or the like, for example.

Figure 5F:
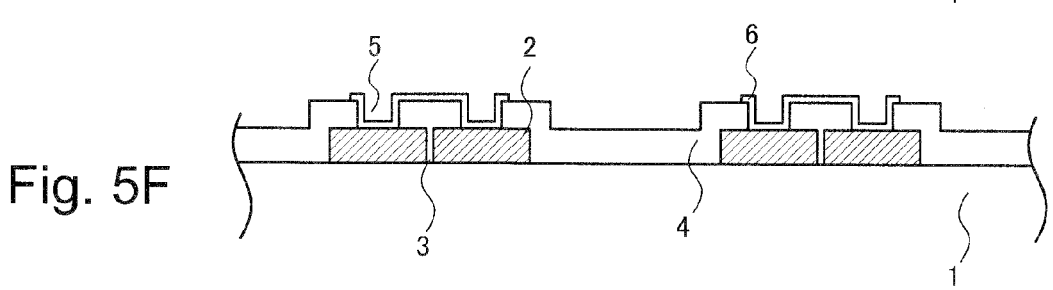

Next, as shown in FIG. 5F, a connection region will be completed by patterning the surface conductive layer 6. An ordinary photolithography technology can be used for patterning this surface conductive layer 6. According to this embodiment, a positive resist is formed in a portion which leaves the pattern of the surface conductive layer 6, and the surface conductive layer 6 is removed by etching using this resist as a mask. In this exemplary embodiment, the surface conductive layer 6 is also formed on the insulating layer 4 formed on the upper portion of the slit 3. The surface conductive layer 6 shown in FIG. 5F will be completed by removing the resist. The surface conductive layer 6 is formed here so that the contact hole 5 is covered with it completely. A connection region pressure-welded to the TCP wiring 9 is formed via the ACF 7 of the contact hole 5 and the surface conductive layer 6. A wet etching method which uses an aqua regia which is a mixed acid of a hydrochloric acid and a nitric acid, for example can be used for etching the surface conductive layer 6.

As described above, in this exemplary embodiment, the metal wiring layer 2 of at least one terminal electrode of the TFT substrate 1 is divided into two or more by the slit 3. When a misplacement of the metal wiring layer 2 to the TCP wiring 9 arises in TCP pressure welding, corrosion of the metal wiring layer 2 may occur at the edge of the contact hole 5 not covered with the TCP wiring 9. However, since the progress of corrosion can be stopped at the slit 3 according to the LCD device by this exemplary embodiment, last disconnection of wire of the metal wiring layer 2 can be prevented, and connectivity of the connection region can be maintained.

Figure 6A:
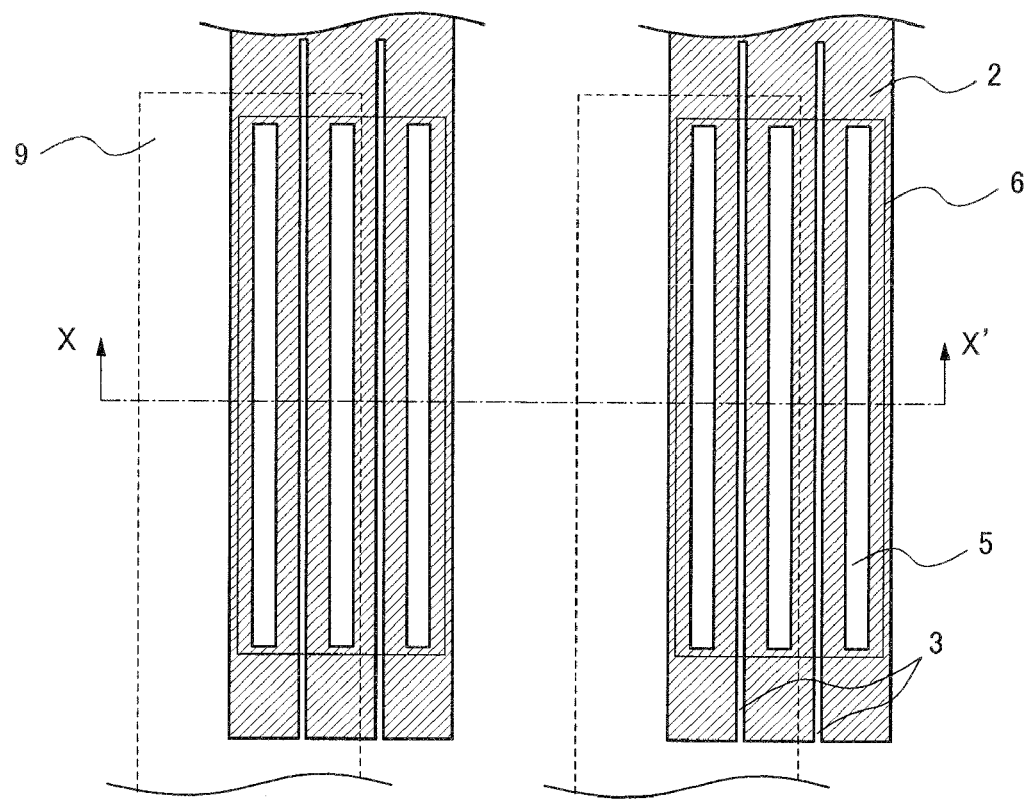
FIG. 6A is a plan view showing a structure (a case of misplacement) of a terminal electrode in a state that a TCP is press-welded to a TFT substrate according to a second exemplary embodiment of the present invention.
Figure 6B:
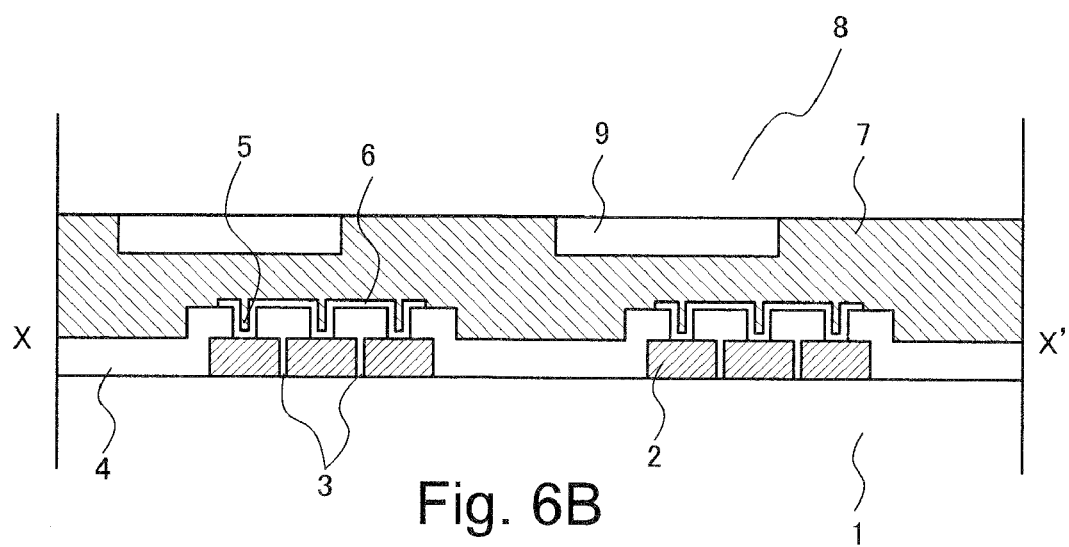
FIG. 6B is a cross sectional view along an X-X' line of FIG. 6A.

Next, an LCD device, which is an example of a display device, according to a second exemplary embodiment of the present invention will be described with reference to FIG. 6. FIG. 6A is a plan view and FIG. 6B is a cross sectional view along an X-X' line of FIG. 6A.

In the first exemplary embodiment mentioned above, although the case where the metal wiring layer 2 is divided into two wiring areas is shown, if not only this but the metal wiring layer 2 is divided into more than three areas, as for an isolation construction of a metal wiring layer, a beneficial effect of the present invention will be obtained. A structure of the connection region when forming the slit 3 at two positions in each terminal electrode, and separating a metal wiring layer 2 into three wiring areas, is shown in FIG. 6. A contact hole 5 is formed respectively in three wiring areas of the metal wiring layer 2.

According to the structure of the terminal electrode of this exemplary embodiment, even if corrosion occurs at a contact hole edge which is not covered by the TCP wiring 9, and the corrosion progresses, progress of the corrosion can be stopped in the first slit 3. Therefore, electrical connection between the TFT substrate 1 and the TCP 8 is maintainable by two contact holes 5 among contact holes 5 formed three pieces. According to this exemplary embodiment, the area of the contact hole by which a connection is maintained when corrosion occurs and progresses, becomes larger than the case by the first exemplary embodiment. Accordingly, the reduction of connection resistance in the connection region can be achieved.

As shown in FIG. 6A, the slit 3 is formed longer than the contact hole 5 completely. It is desirable that the slit 3 extends over the tip ends of the contact hole 5, i.e., an upward direction and a downward direction on a drawing sheet of FIG. 6A. This is because, even if the corrosion generated at the tip end of the contact hole 5 extends toward outside the contact hole 5, elongated the slit 3 prevents the corrosion to reach adjacent contact hole and thus last disconnection is avoided. It is desirable to form the slit 3 so that the metal wiring layer 2 which forms the terminal electrode may be separated completely to form a branched electrode at a side of a lower portion of FIG. 6A, i.e., a tip end area of a terminal electrode. However, as long as there is an enough tip end area for the terminal electrode, the slit 3 at the side of a lower portion of FIG. 6A may be formed not to extend outside of the tip end of the terminal electrode as well as the side of the upper portion (lead area). As an extended distance at this case, it can be considered, for example as a distance larger than width of each branched metal wiring layer 2.

Next, an LCD device, which is an example of a display device, according to a third exemplary embodiment of the present invention will be described with reference to FIG. 7. In the first and the second exemplary embodiments mentioned above, the metal wiring layer 2 is separated by the slit 3. In contrast to them, the metal wiring layer 2 is made into isolation construction formed from two metal wiring layers formed in a different layer in a lamination direction by this exemplary embodiment.

Figure 7A:
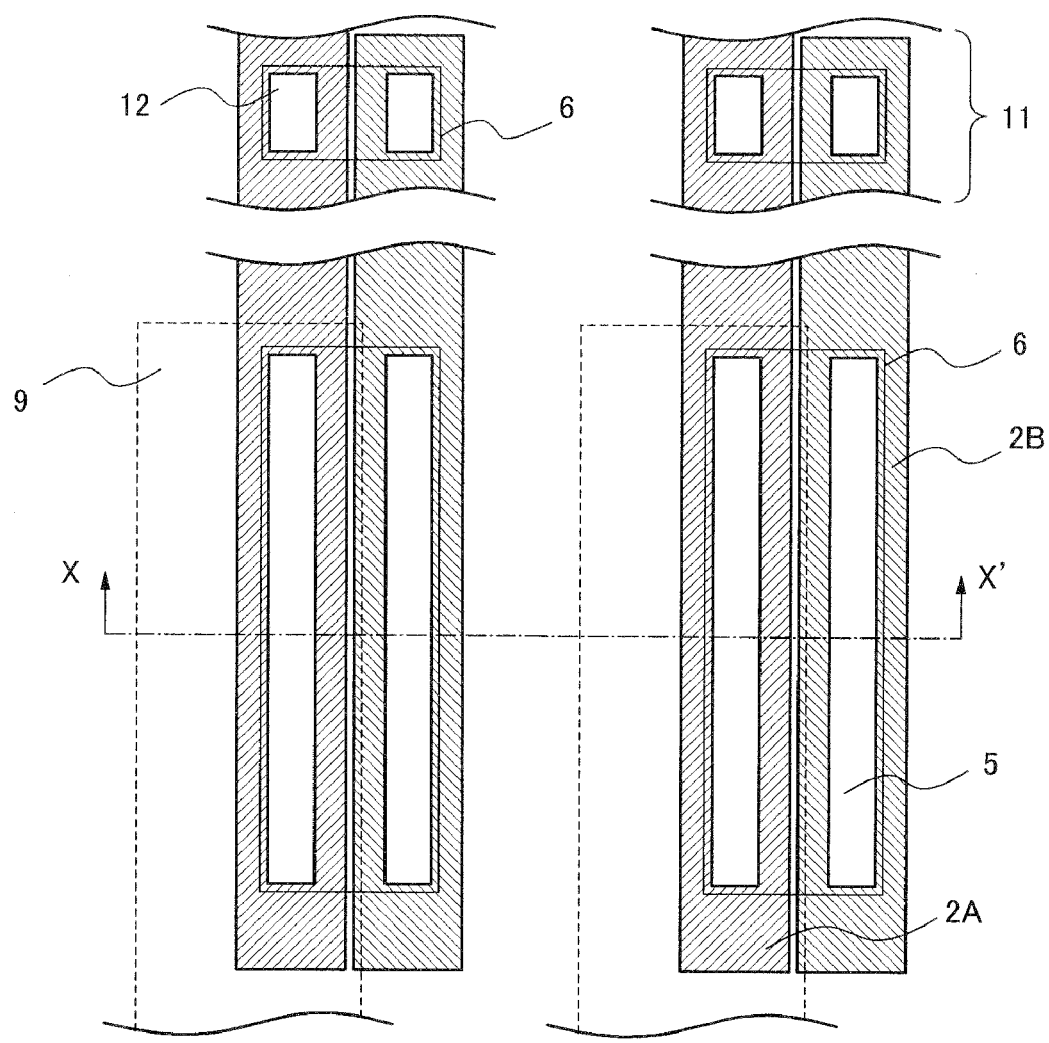
FIG. 7A is a plan view showing a structure (a case of misplacement) of a terminal electrode in a state that a TCP is press-welded to a TFT substrate according to a third exemplary embodiment of the present invention.
Figure 7B:
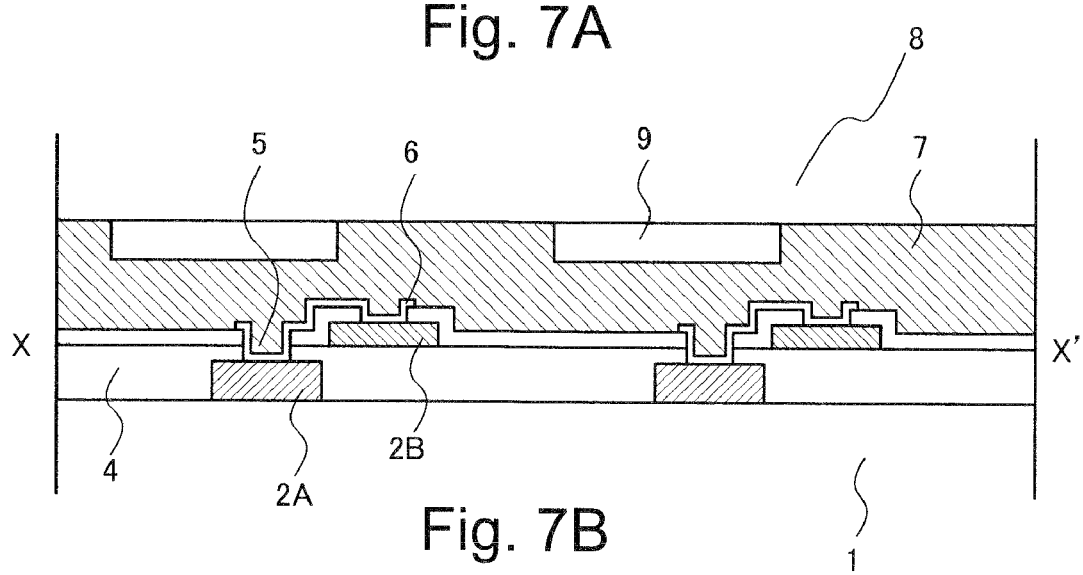
FIG. 7B is a cross sectional view along an X-X' line of FIG. 7A.

A structure of a connection region in a state where the TCP 8 is pressure-welded to the TFT substrate 1 of an LCD device by this exemplary embodiment is shown in FIG. 7. FIG. 7A is a plan view and FIG. 7B is a cross sectional view along an X-X' line of FIG. 7A. As shown in FIG. 7B, the metal wiring layer 2 of each connection region is divided into a first metal wiring layer 2A and a second metal wiring layer 2B which are formed in different layers of a lamination direction to the TFT substrate 1, respectively. Here, the first metal wiring layer 2A and the second metal wiring layer 2B correspond to two or more wiring areas.

In FIG. 7B, the configuration that the first metal wiring layer 2A and the second metal wiring layer 2B in the connection region are connected via the surface conductive layer 6 is adopted. In addition to this configuration or instead of this configuration, configuration of providing a different layer joint 11 in areas other than the connection region as shown in FIG. 7A may be used. The first metal wiring layer 2A and the second metal wiring layer 2B are connected via the surface conductive layer 6 in this different layer joint 11. Since a contact hole 12 for electrically connecting each metal wiring layer and the surface conductive layer 6 is formed in the different layer joint 11, it is easy to be influenced by outside environments, such as moisture. Accordingly, it is desirable to provide the different layer joint 11 in an area by the side of a display area of an area which forms the sealant 15 for sticking together the TFT substrate 1 and the CF substrate 13 shown in FIG. 1.

According to this exemplary embodiment, although the metal wiring layer is connected using a surface conductive layer 6 in the different layer joint 11, connection of the metal wiring layer is not limited to this, but structure of connecting directly the metal wiring layers formed in different layers may be available, and it may be connected by another conductive layer. Although the metal wiring layer 2 is two-layer in this exemplary embodiment, a configuration of three or more layers may be used.

According to this exemplary embodiment, since the metal wiring layer 2 is divided into the lamination direction when corrosion occurred and progresses in one metal wiring layer by shifting at the time of TCP pressure welding, corrosion does not progress to the other metal wiring layer. Therefore, a connection in the connection region can be maintained certainly.

Next, an LCD device, which is an example of a display device, according to a fourth exemplary embodiment of the present invention will be described with reference to FIG. 8.

Figure 8A:
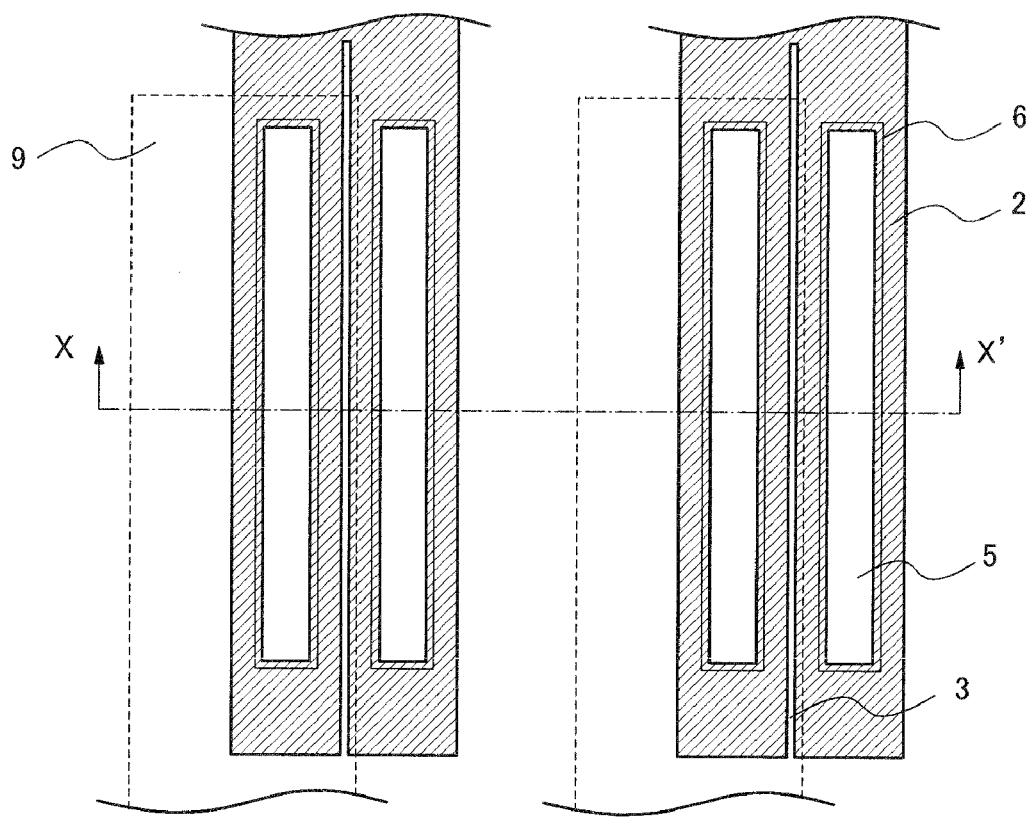
FIG. 8A is a plan view showing a structure (a case of misplacement) of a terminal electrode in a state that a TCP is press-welded to a TFT substrate according to a fourth exemplary embodiment of the present invention.
Figure 8B:
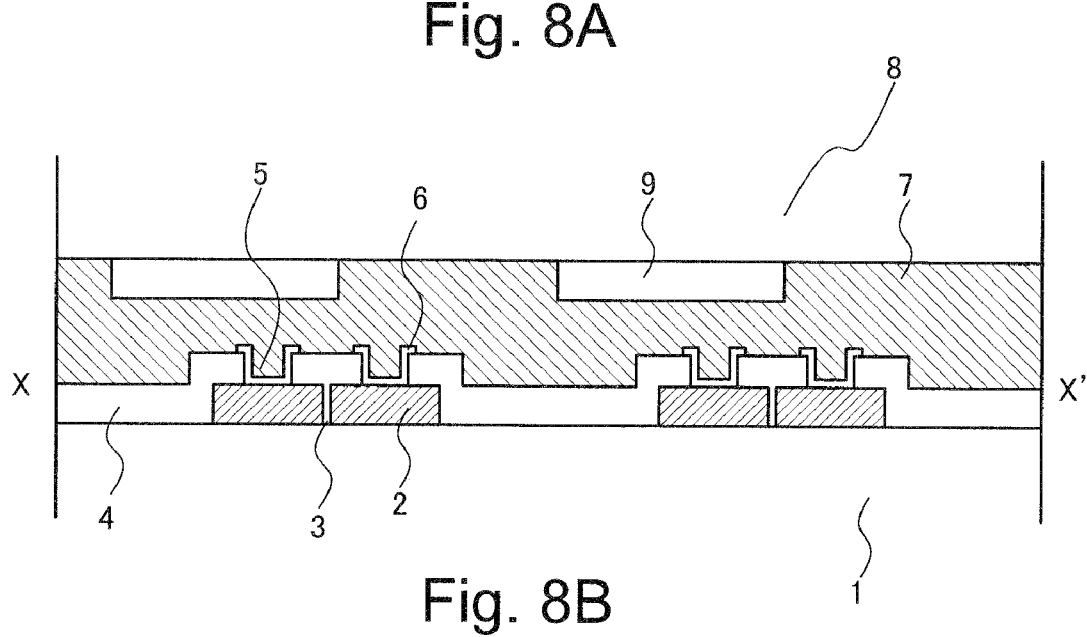
FIG. 8B is a cross sectional view along an X-X' line of FIG. 8A.

FIG. 8 shows a structure of a connection region in a state that a TCP 8 is pressure-welded to a TFT substrate 1 of the LCD device according to this exemplary embodiment. FIG. 8A is a plan view and FIG. 8B is a cross sectional view along an X-X' line of FIG. 8A. According to this exemplary embodiment, a pattern of the surface conductive layer 6 is changed from that in first exemplary embodiment shown in FIG. 2, and the surface conductive layer 6 as well as a metal wiring layer 2 is made into an isolation construction. As shown in FIG. 8, the contact hole 5 is formed so that it may be formed in two places corresponding to each of the separated metal wiring layer 2 and the surface conductive layer 6 may separate into each of these two contact holes 5.

Here, as explained in the first exemplary embodiment, with elapsed time, the corrosion of the metal wiring layer 2 occurred at the contact hole edge propagates the metal wiring layer 2, and progresses to the contact hole edge of the opposite side. On the other hand, a corrosion reaction may arise and the corrosion may invade also in the surface conductive layer 6 covering the contact hole 5, although propagation velocity thereof is slower than that in the metal wiring layer 2. However, in the connection region according to this exemplary embodiment, since the surface conductive layer 6 is also separated and formed, a path for which corrosion spreads does not exist. Therefore, progress of the corrosion can be prevented completely.

The slit 3 is formed longer than the contact hole 5 completely. It is desirable that the slit 3 extends over the tip ends of the contact hole 5, i.e., an upward direction and a downward direction on a drawing sheet of FIG. 8A. This is because, even if the corrosion generated at the tip end of the contact hole 5 extends toward outside the contact hole 5, elongated slit 3 prevents the corrosion to reach adjacent contact hole and thus total disconnection is avoided. It is desirable to form the slit 3 so that the metal wiring layer 2 which forms the terminal electrode may be separated completely to form a branched electrode at a side of a lower portion of FIG. 8A, i.e., a tip end area of a terminal electrode. However, as long as there is an enough tip end area for the terminal electrode, the slit 3 at the side of a lower portion of FIG. 8A may be formed not to extend outside of the tip end of the terminal electrode as well as the side of the upper portion (lead area). As an extended distance at this case, it can be considered, for example as a distance larger than width of each branched metal wiring layer 2.

Next, an LCD device, which is an example of a display device, according to a fifth exemplary embodiment of the present invention will be described with reference to FIG. 9.

Figure 9A:
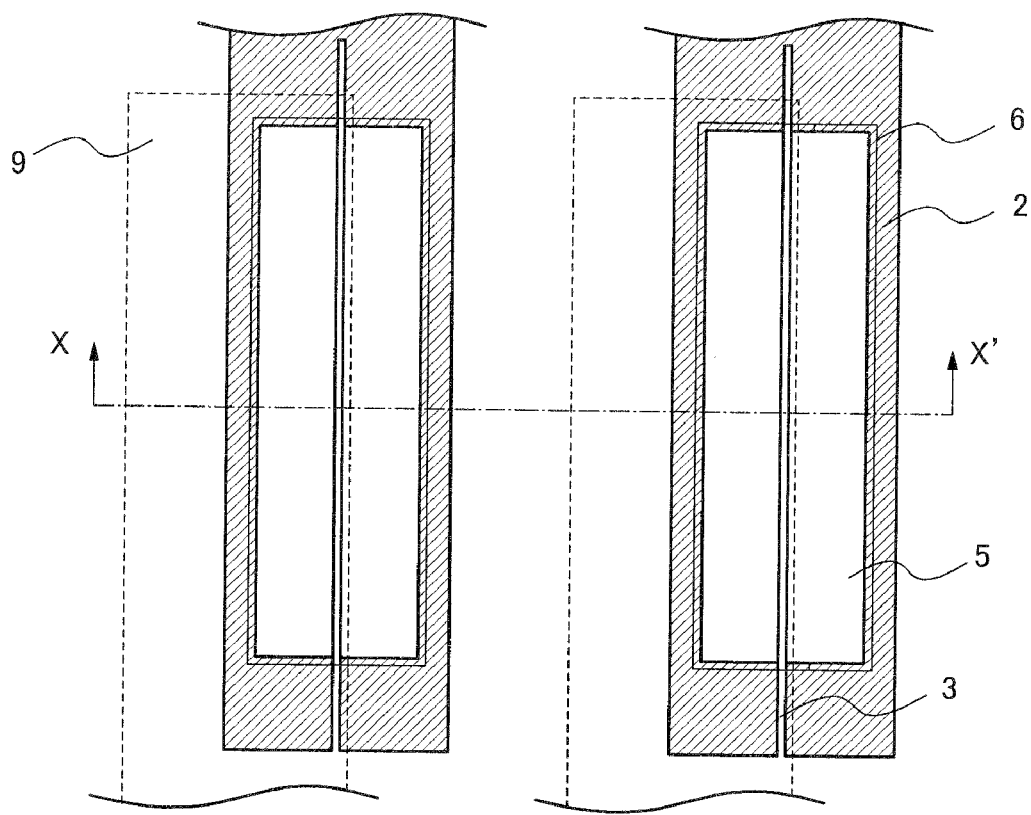
FIG. 9A is a plan view showing a structure (a case of misplacement) of a terminal electrode in a state that a TCP is press-welded to a TFT substrate according to a fifth exemplary embodiment of the present invention.
Figure 9B:
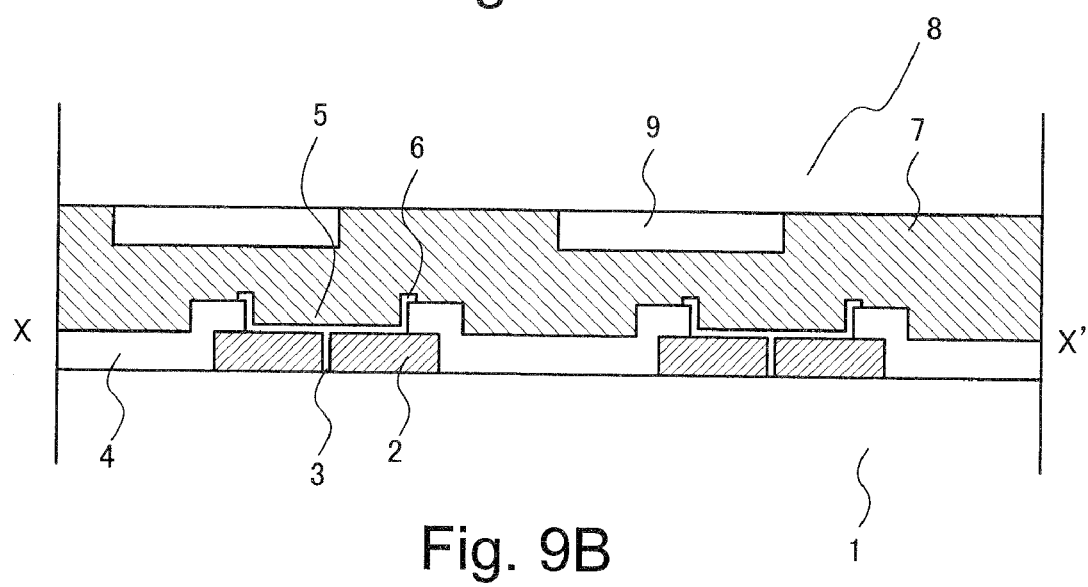
FIG. 9B is a cross sectional view along an X-X' line of FIG. 9A.
Figure 10:
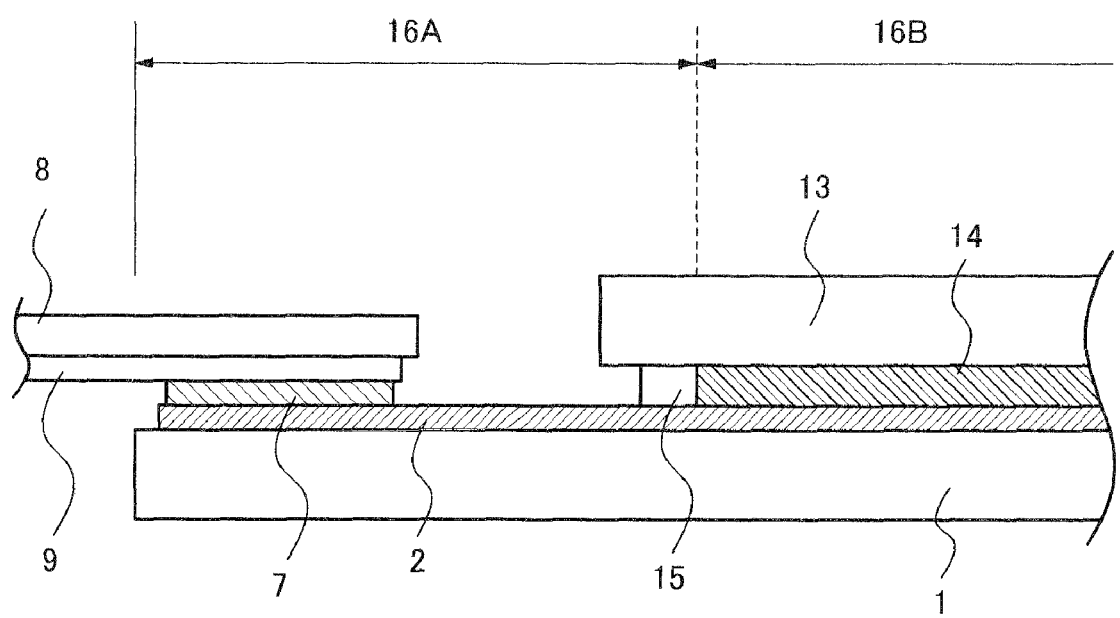
FIG. 10 is a cross sectional view showing a structure of a related LCD device.

FIG. 9 shows a structure of a connection region in a state where a TCP 8 is pressure-welded to a TFT substrate 1 of an LCD device concerning according to this exemplary embodiment. FIG. 9A is a plan view and FIG. 9B is a cross sectional view along an X-X' line of FIG. 9A. According to this exemplary embodiment, a contact hole 5 is formed to cross a metal layer removing portion (a slit) 3. That is, one contact hole 5 is formed in common with two wiring areas which form a separated metal wiring layer 2, and an insulating layer 4 is not formed in an upper surface of the slit 3. And a surface conductive layer 6 is formed so that the contact hole 5 may be covered completely. Accordingly, because a contact area of the metal wiring layer 2 and the surface conductive layer 6 becomes large, the contact resistance between the metal wiring layer 2 and the surface conductive layer 6 can be made smaller. Corrosion may spread through the surface conductive layer 6 as explained in the fourth exemplary embodiment. However, propagation velocity of corrosion of the surface conductive layer 6 consisting of ITO or the like is slow as compared with the metal wiring layer 2. Accordingly, a probability which corrosion propagates through the surface conductive layer 6 to the separated metal wiring layer 2 of the other is low, and connection in the separated metal wiring layer 2 of the other can fully be maintained.

As mentioned above, in this exemplary embodiment, the insulating layer 4 is not formed on the upper surface of the slit 3. Therefore, corrosion may occur from an edge of the slit 3. However, even if in this case, at least one or more TCP wiring 9 are formed in the TCP 8 from a single area which is not divided into two or more. Thereby, this problem can be avoided. That is, since the TCP wiring 9 is made into arrangement which covers the slit 3 by making the TCP wiring 9 into one area, corrosion can be prevented from occurring from the edge of the slit 3. This is because permeation of moisture or the like onto the slit which causes corrosion can be prevented with the TCP wiring 9. In this case, since an area in which corrosion occurs is limited to one edge of the metal wiring layer 2 not covered with the TCP wiring 9 like a case in above-mentioned exemplary embodiment, progress of corrosion can be prevented at the slit 3.

In this exemplary embodiment, the slit 3 is formed longer than the contact hole 5 completely. It is desirable that the slit 3 extends over the tip ends of the contact hole 5, i.e., an upward direction and a downward direction on a drawing sheet of FIG. 9A. This is because, even if the corrosion generated at the tip end of the contact hole 5 extends toward outside the contact hole 5, elongated slit 3 prevents the corrosion to reach adjacent contact hole and thus total disconnection is avoided. It is desirable to form the slit 3 so that the metal wiring layer 2 which forms the terminal electrode may be separated completely to form a branched electrode at a side of a lower portion of FIG. 9A, i.e., a tip end area of a terminal electrode. However, as long as there is an enough tip end area for the terminal electrode, the slit 3 at the side of a lower portion of FIG. 9A may be formed not to extend outside of the tip end of the terminal electrode as well as the side of the upper portion (lead area). As an extended distance at this case, it can be considered, for example as a distance larger than width of each branched metal wiring layer 2.

Next, a method of forming a connection region of an LCD device according to this exemplary embodiment will be described. Although it is the same as the case of the first exemplary embodiment basically, this exemplary embodiment is different in a point that the insulating layer 4 on the slit 3 also needs to be removed in case of contact hole formation shown in FIG. 5D. For example, a dry etching method using an etching gas such as an $SF_6$ system or a $CHF_3$ system and a wet etching method can be used in an etching for forming a contact hole. In this exemplary embodiment, in the etching for forming the contact hole, the TFT substrate 1 exposed in the slit 3 may also be etched, and a side etching of a lower layer substrate under the metal wiring layer 2 may occur. And if side etching occurs, the metal wiring layer 2 will overhang, step coverage of the surface conductive layer 6 is decreased, and moisture in a manufacturing process accumulates to cause a fall in reliability of a terminal. It is preferable to use an anisotropic-dry-etching method, such as an RIE (reactive ion etching) method which can prevent side etching of the TFT substrate 1, or an etching method with a high selection ratio of the insulating layer 4 and the TFT substrate 1.

Although the TFT substrate is used in the first to the fifth exemplary embodiments mentioned above as the first substrate constituting an LCD device, the present invention can be applied not only this but an LCD device using an active matrix substrate with other switching elements other than TFTs. Although an LCD device is used in the exemplary embodiments mentioned above as the display device, the present invention can be applied not only this but other display devices in which a group of terminal electrodes on its substrate connect to a group of wiring terminals on an external wiring board.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A display device, comprising:
a first substrate having a group of terminal electrodes on one side thereof, at least one of said terminal electrodes forming a branched electrode with an isolation region extending along an elongating direction of each said terminal electrode; and
a second substrate opposing said first substrate such that said terminal electrodes are exposed from an overlapping area of said first substrate and said second substrate,
wherein separated portions of said branched electrode are formed in a different layer, respectively.

2. The display device according to claim 1, further comprising:
an insulating layer covering said terminal electrodes; and
a contact hole formed in an opening formed in said insulating layer by exposing a portion of said terminal electrodes.

3. The display device according to claim 2, further comprising a surface conductive layer covering said contact hole so to be electrically connected to said terminal electrodes.

4. The display device according to claim 2, further comprising:
additional contact holes formed in additional openings formed in said insulating layer by exposing two or more portions of lead area of said branched electrode; and
additional surface conductive layer covering said additional contact holes.

5. The display device according to claim 1, further comprising:
a joint member connecting different layers, said joint member being arranged in an area other than said terminal electrodes such that said joint member electrically connect two regions of said branched electrode.

6. The display device according to claim 5, further comprising:
a sealant arranged at a periphery of a display area thereof, said sealant sealing liquid crystal material between said first substrate and said second substrate, and said joint member being located in said display area of an inner area of said sealant.

* * * * *